United States Patent
Saitou

(10) Patent No.: US 10,996,655 B2
(45) Date of Patent: May 4, 2021

(54) NUMERICAL CONTROLLER

(71) Applicant: Fanuc Corporation, Yamanashi (JP)

(72) Inventor: Kiwamu Saitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 57 days.

(21) Appl. No.: 16/437,033

(22) Filed: Jun. 11, 2019

(65) Prior Publication Data

US 2019/0391565 A1  Dec. 26, 2019

(30) Foreign Application Priority Data

Jun. 22, 2018  (JP) ............................. JP2018-119098

(51) Int. Cl.
*G05B 19/4155* (2006.01)

(52) U.S. Cl.
CPC ............ *G05B 19/4155* (2013.01); *G05B 2219/36504* (2013.01)

(58) Field of Classification Search
None
See application file for complete search history.

(56) References Cited

U.S. PATENT DOCUMENTS

| 4,958,245 | A | * | 9/1990 | Roth | ............... | G11B 5/584 360/77.03 |
|---|---|---|---|---|---|---|
| 2005/0010327 | A1 | | 1/2005 | Nakamura | | |
| 2008/0018287 | A1 | | 1/2008 | Ogawa | | |

FOREIGN PATENT DOCUMENTS

| JP | 06075618 A | 3/1994 |
|---|---|---|
| JP | 2005-31904 A | 2/2005 |
| JP | 2008015740 A | 1/2008 |

OTHER PUBLICATIONS

Japanese Notice of Reasons for Refusal for Japanese Application No. 2018-119098, dated Aug. 18, 2020, with translation, 6 pages.

* cited by examiner

*Primary Examiner* — Carlos R Ortiz Rodriguez
(74) *Attorney, Agent, or Firm* — RatnerPrestia

(57) ABSTRACT

A numerical controller, which can handle information on a use tool, calculates the shape of a workpiece being machined, based on an input machining program, shape information of the use tool, shape information of a unmachined workpiece, and a tool trajectory, and sets, as a movable range of the tool, a range in which the tool never contacts the workpiece being machined, based on the calculated shape of the workpiece being machined, if manual operation is performed during machining.

3 Claims, 9 Drawing Sheets

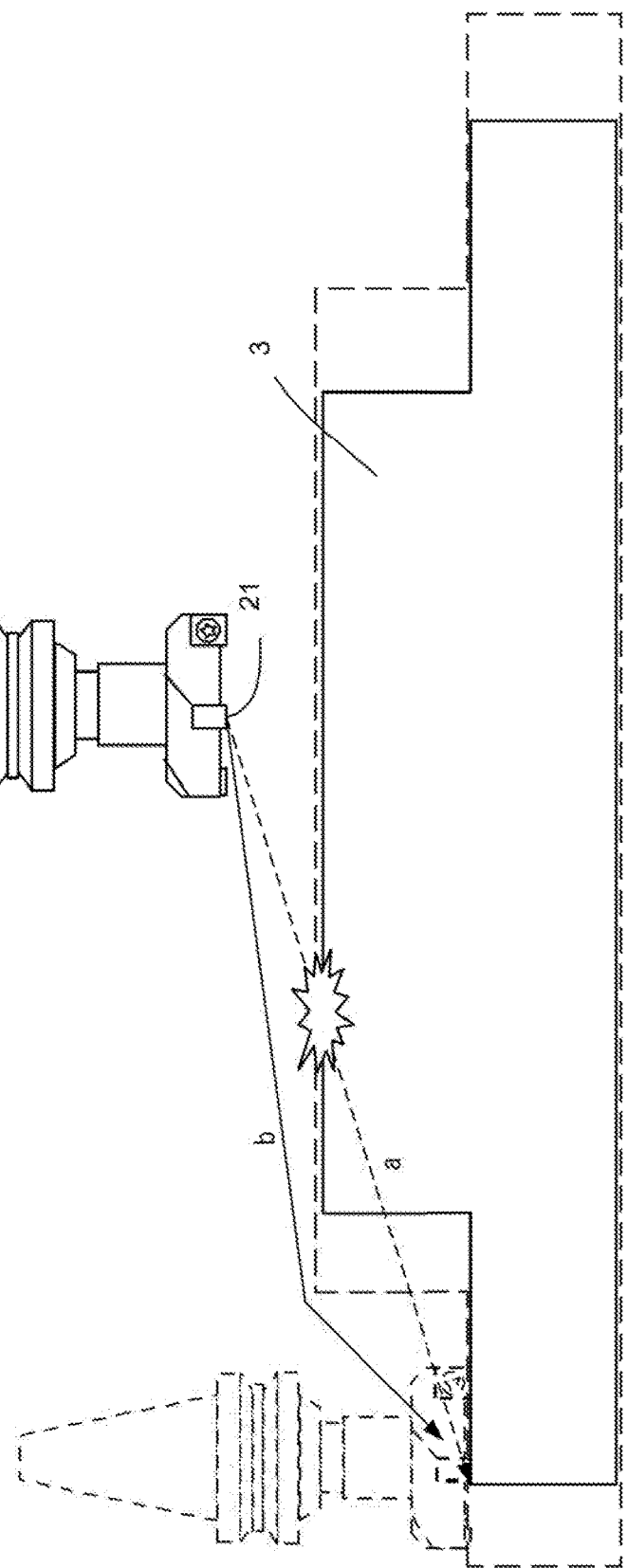

NUMERICAL CONTROLLER

RELATED APPLICATIONS

The present application claims priority to Japanese Patent Application Number 2018-119098 filed Jun. 22, 2018, the disclosure of which is hereby incorporated by reference herein in its entirety.

BACKGROUND OF THE INVENTION

Field of the Invention

The present invention relates to a numerical controller, and more particularly, to a numerical controller capable of detecting erroneous operation.

Description of the Related Art

At a machining site where an industrial machine (hereinafter simply referred to as the "machine") such as a machine tool is used, manual operation may sometimes be performed by means of a manipulator of a numerical controller after stopping automatic operation of the machine during machining. The manual operation is performed in order to confirm dimensions or remove chips, for example. When this is done, if the manual operation has an error (e.g., an error in the retracting direction or omission of a decimal point) such that a tool contacts an object (e.g., a workpiece being machined or a component of the machine) that originally should not be contacted, defective machining or machine breakage will be caused.

A method for detecting erroneous operation is disclosed in, for example, Japanese Patent Application Laid-Open No. 2005-031904. In the method described in Japanese Patent Application Laid-Open No. 2005-031904, an area in which a material and a tool interfere with each other is calculated.

According to the technique described in Japanese Patent Application Laid-Open No. 2005-031904, however, the occurrence of the interference is calculated based on the shape of the material, that is, the shape of an unmachined workpiece, so that the occurrence of the interference based on the shape of the workpiece being machined cannot be calculated. This is because the shape of the workpiece being machined cannot be identified by only using information included in a conventional machining program that is created using conventional G-codes.

SUMMARY OF THE INVENTION

The present invention has been made to solve the above problem and has an object to provide a numerical controller capable of detecting erroneous operation.

A numerical controller according to the present invention is capable of handling information on a use tool and includes: a machining program input unit configured to input a machining program, shape information of a use tool, and shape information of an unmachined workpiece; a workpiece shape calculation unit configured to calculate the shape of a workpiece being machined, based on the information of the use tool, the information of the unmachined workpiece, and a tool trajectory; and a movable range setting unit configured to set, as a movable range of the tool, a range in which the tool never contacts the workpiece being machined, based on the shape of the workpiece being machined, if manual operation is performed during machining.

A movement path may be set in the movable range when moving the tool to a machining restart position at the restart of the machining after suspension of the machining.

The machining program may be a general-purpose command which is independent of a machine and in which the shape information of the use tool and the shape information of the unmachined workpiece are described in a format conforming to a hierarchical data model.

According to the present invention, there can be provided a numerical controller capable of detecting erroneous operation.

BRIEF DESCRIPTION OF THE DRAWINGS

FIG. 9 is a diagram showing the operation of the numerical controller of FIG. 2 at the time of restart of machining.

DETAILED DESCRIPTION OF THE PREFERRED EMBODIMENTS

There are known a machining program including information such as a machining shape, machining method, and use tool, and a numerical controller capable of handling the machining program. The numerical controller of this type is particularly called an integrated CNC system.

A workpiece shape at an arbitrary time during machining can be calculated by further incorporating shape information of an unmachined workpiece into such a machining program. Therefore, a numerical controller 1 can use this workpiece shape and use tool information to limit the movable range of a feed axis lest the tool and the workpiece be caused to collide with each other by erroneous operation during manual intervention.

The numerical controller 1 according to an embodiment of the present invention is the integrated CNC system that handles the machining program including information such as the machining shape, machining method, use tool, and unmachined workpiece shape. The machining program mentioned in the present embodiment is the one that includes the machining shape, machining method, use tool, and unmachined workpiece shape unless otherwise specified.

Figure 1:
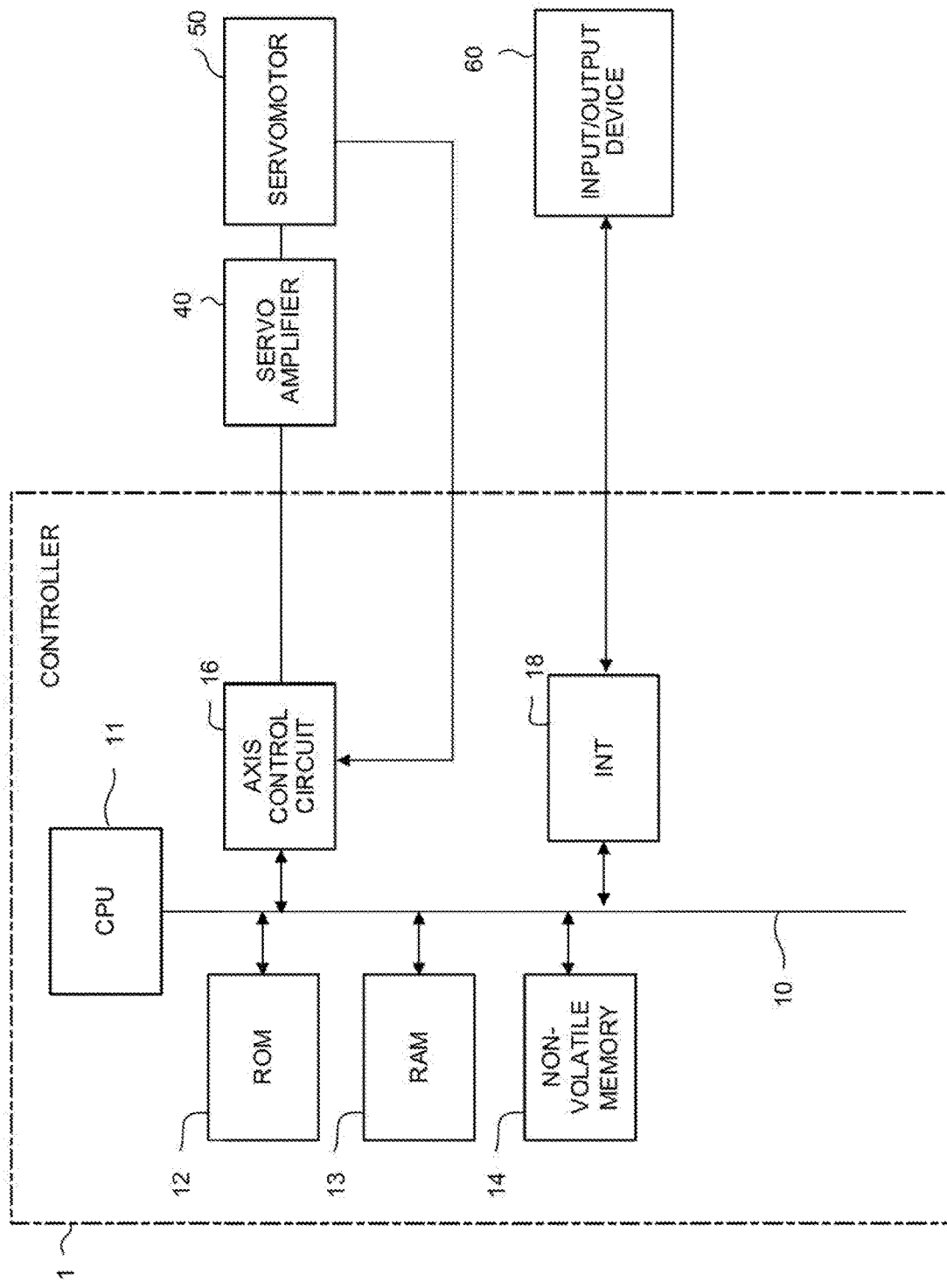
FIG. 1 is a diagram showing a hardware configuration of a numerical controller according to an embodiment of the present invention.

FIG. 1 is a schematic hardware configuration diagram showing principal parts of the numerical controller 1.

The numerical controller 1 is a device for controlling a machine tool (not shown) and comprises a CPU 11, ROM 12, RAM 13, non-volatile memory 14, interface 18, bus 10, and axis control circuit 16. The numerical controller 1 is connected with a servo amplifier 40, servomotor 50, and input/output device 60.

The CPU 11, which is a processor for generally controlling the numerical controller 1, reads out a system program stored in the ROM 12 via the bus 10 and controls the entire numerical controller 1 according to the system program.

The ROM 12 is previously loaded with system programs for executing various controls of the machine tool. The RAM 13 is temporarily loaded with temporary calculation data and display data, various data and programs input by the operator through an input/output device 60 (described later), and the like. The non-volatile memory 14 is backed up by, for example, a battery (not shown) so that its storage state can be maintained even when the numerical controller 1 is switched off. The non-volatile memory 14 stores data, programs, and the like input through the input/output device 60. The programs and data stored in the non-volatile memory 14 may be developed in the RAM 13 during execution and use.

The axis control circuit 16, which is configured to control the motion axes of the machine tool, receives a movement command amount for each axis output by the CPU 11 and outputs a movement command for the axis to the servo amplifier 40. On receiving the axis movement command output by the axis control circuit 16, the servo amplifier 40 drives the servomotor 50. The servomotor 50 is driven by the servo amplifier 40 to move the motion axes of the machine tool. The servomotor 50 typically has a position/speed detector (not shown) built-in. The position/speed detector outputs a position/speed feedback signal, and position/speed feedback control is performed as this signal is fed back to the axis control circuit 16.

In FIG. 1, the axis control circuit 16, servo amplifier 40, and servomotor 50 are each shown as being only one in number. Actually, however, these elements are provided corresponding in number to the axes of the machine tool to be controlled. If the controlled machine tool has three axes, for example, three sets, in total, of the axis control circuit 16, servo amplifier 40, and servomotor 50 are provided corresponding individually to the axes.

The input/output device 60 is a data input/output device equipped with a display, hardware keys, and the like, and is typically a control panel. The input/output device 60 displays information received from the CPU 11 through the interface 18 on the display. The input/output device 60 delivers commands and data input from the hardware keys and the like to the CPU 11 through the interface 18. According to the input/output device 60, the programs stored in the non-volatile memory 14 can be displayed on the display and edited by means of the hardware keys, for example.

Figure 2:
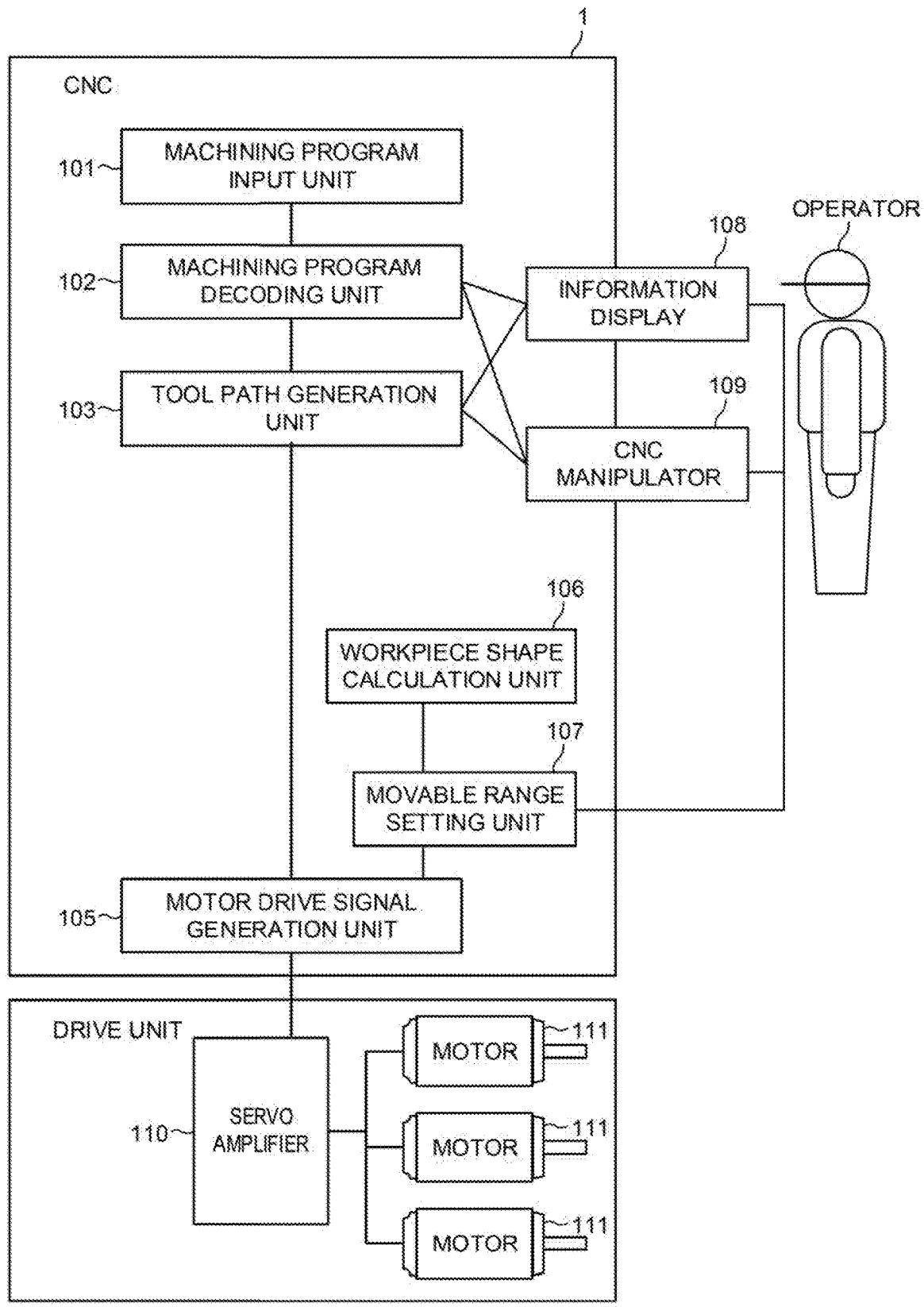
FIG. 2 is a diagram showing a functional configuration example of the numerical controller of FIG. 1.

FIG. 2 is a block diagram showing a schematic functional configuration of the numerical controller 1 capable of detecting erroneous operation.

The numerical controller 1 comprises a machining program input unit 101, machining program decoding unit 102, tool path generation unit 103, motor drive signal generation unit 105, workpiece shape calculation unit 106, movable range setting unit 107, information display 108, and CNC manipulator 109. Moreover, the numerical controller 1 is connected with a drive unit of the machine tool comprising a servo amplifier 110 and motors 111.

The machining program input unit 101 externally reads machining programs created in advance and loads them into the RAM 13 and the non-volatile memory 14. Moreover, the machining program input unit 101 loads a machining program edited by the operator using the input/output device 60 and the like into the RAM 13 and the non-volatile memory 14. The details of the machining programs handled in the present embodiment will be described later.

The machining program decoding unit 102 interprets the machining program acquired by the machining program input unit 101.

The tool path generation unit 103 generates a tool path based on the result of the interpretation of the machining program by the machining program decoding unit 102.

The motor drive signal generation unit 105, which is equivalent to the aforementioned axis control circuit 16, generates a motor drive signal for moving a tool along the tool path generated by the tool path generation unit 103.

The workpiece shape calculation unit 106 calculates the shape of a workpiece being machined, based on the machining program acquired by the machining program input unit 101.

The movable range setting unit 107 limits the movable range of the tool lest the workpiece being machined and the tool interfere with each other, based on the workpiece shape calculated by the workpiece shape calculation unit 106.

The information display 108 displays the machining program read by the machining program input unit 101, a warning message output by the movable range setting unit 107, and the like on the display of the input/output device 60.

The CNC manipulator 109 is a device that provides an interface for inputting editing of the machining program, manual operation of the machine, and the like. For example, a conventional device of a type integrated with the numerical controller 1, pendant type, remote-control type, or the like can be employed as the CNC manipulator 109.

The servo amplifier 110, which is equivalent to the aforementioned servo amplifier 40, receives the motor drive signal output by the motor drive signal generation unit 105 and drives the motors 111.

The motors 111, which are equivalent to the aforementioned servomotor 50, are driven by the servo amplifier 110 to move the motion axes of the machine.

The following is a description of the machining program handled by the numerical controller 1. The machining program input unit 101 of the numerical controller 1 should preferably receive as an input the machining program described in association with the information on the machining shape, machining method, use tool, and unmachined workpiece shape. This method will mainly be dealt with in the present embodiment. However, the entire information on the machining shape, machining method, use tool, and unmachined workpiece shape need not be input from a single file. For example, such a method may be devised that the machining method is described in the machining program, the machining shape is given as a CAD file, the use tool and the unmachined workpiece shape are previously registered in the numerical controller 1, and the numerical controller 1 associates these pieces of information with one another using the feature ID of the CAD file, use tool number, unmachined workpiece ID, and the like. Moreover, all the pieces of information on the machining shape, machining method, use tool, and unmachined workpiece shape need not be completely prepared and it is necessary only that at least the information on the use tool and the unmachined workpiece shape be prepared.

The following is a description of an example of a suitable information structure for the case where the information on the machining shape, machining method, use tool, and unmachined workpiece shape is input as a single file or machining program. Information required for the control of the machine tool is described in the machining program in compliance with a predetermined form or data model. The ISO 14649 and APT format are known as examples of data model. However, the structure of the machining program is not restricted to these known data models and may be any structure only if it allows a description of necessary information.

In the present embodiment, the data model includes the following pieces of information. Typically, these pieces of information are described as having a hierarchical structure and related pieces of information are associated with one another.

(1) Information on Machining Method

For example, the following pieces of information are related to the machining method (all these pieces of information need not be related, however):

a type of the machining method (information indicative of, e.g., drilling, bottom milling, or side milling);

a more detailed machining strategy according to the machining type (e.g., information indicative of the depths of axial and radial cuts and the path (parallel or spiral) in the case of the bottom milling);

a spindle speed;

a feed rate or cutting amount per cutting edge;

a tool path; and other pieces of information required to identify the machining method (e.g., cutting start and end points).

(2) Information on Cutting Shape

For example, the following pieces of information are related to the machining shape (all these pieces of information need not be related, however):

a type of the machining shape (information indicative of, e.g., a circular hole, flat surface, pocket, free curved surface, or threaded hole); and various dimensions required to identify the shape (e.g., center coordinates, hole direction, diameter, and depth in the case of the circular hole and angles and tolerances of individual dimensions in the case of a cone-shaped bottom).

(3) Information on Use Tool

For example, the following pieces of information are related to the use tool (all these pieces of information need not be related, however):

a type of the tool (information indicative of, e.g., a drill, end mill, face mill, or tapping tool);

various dimensions (e.g., diameter, effective cutting length, and corner R in the case of the end mill);

3D shape information of the tool; and a tool model number.

(4) Information on Unmachined Workpiece Shape

For example, the following pieces of information are related to the unmachined workpiece shape (all these pieces of information need not be related, however):

a type of an unmachined workpiece (e.g., a circular or square column); and various dimensions required to identify the shape (e.g., the diameter and height of the circular column and the length of each side of the square column); and 3D shape information of the unmachined workpiece.

Figure 3:
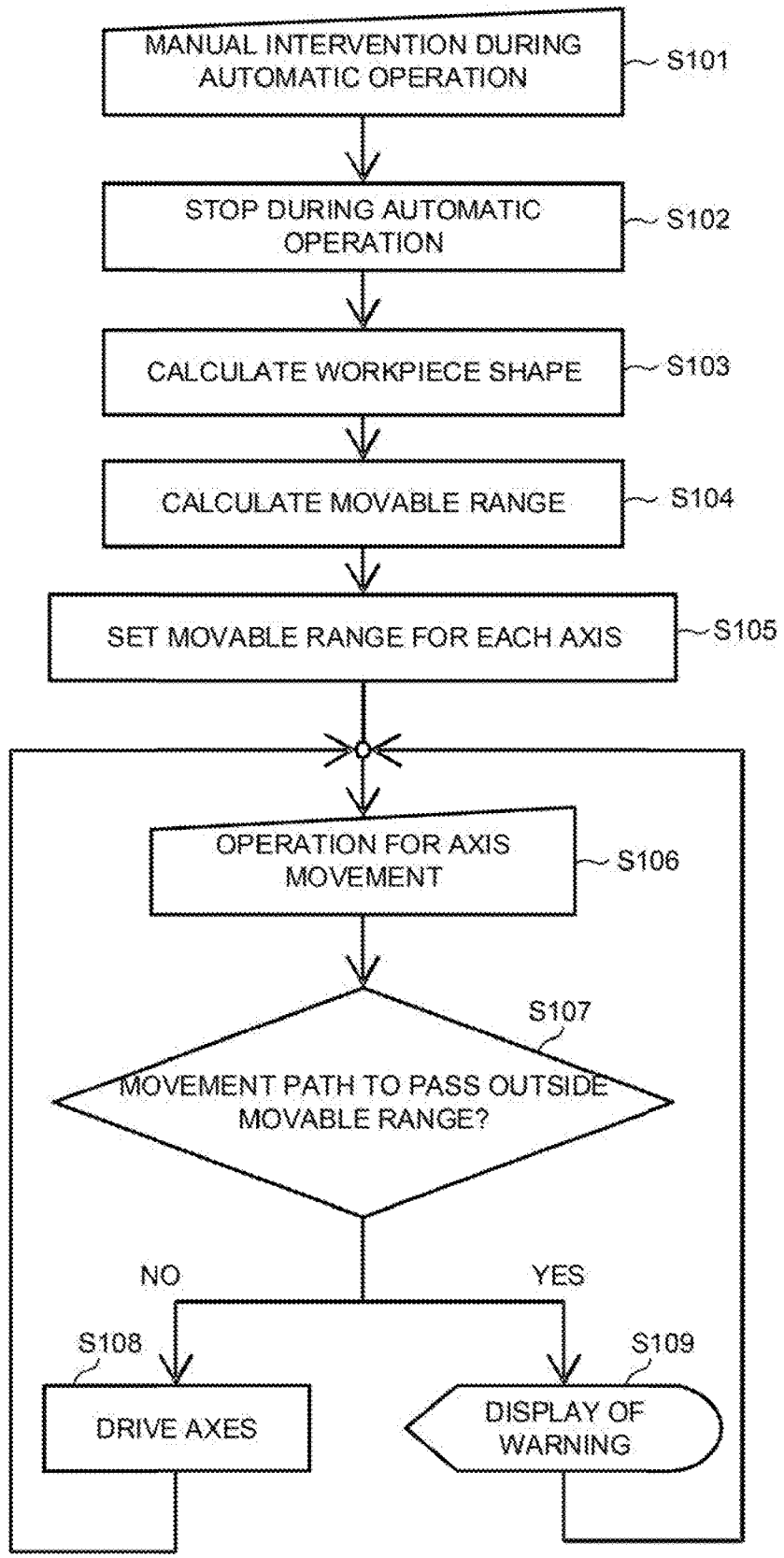
FIG. 3 is a flowchart showing an operation example of the numerical controller of FIG. 2 at the time of manual operation.
Figure 4:
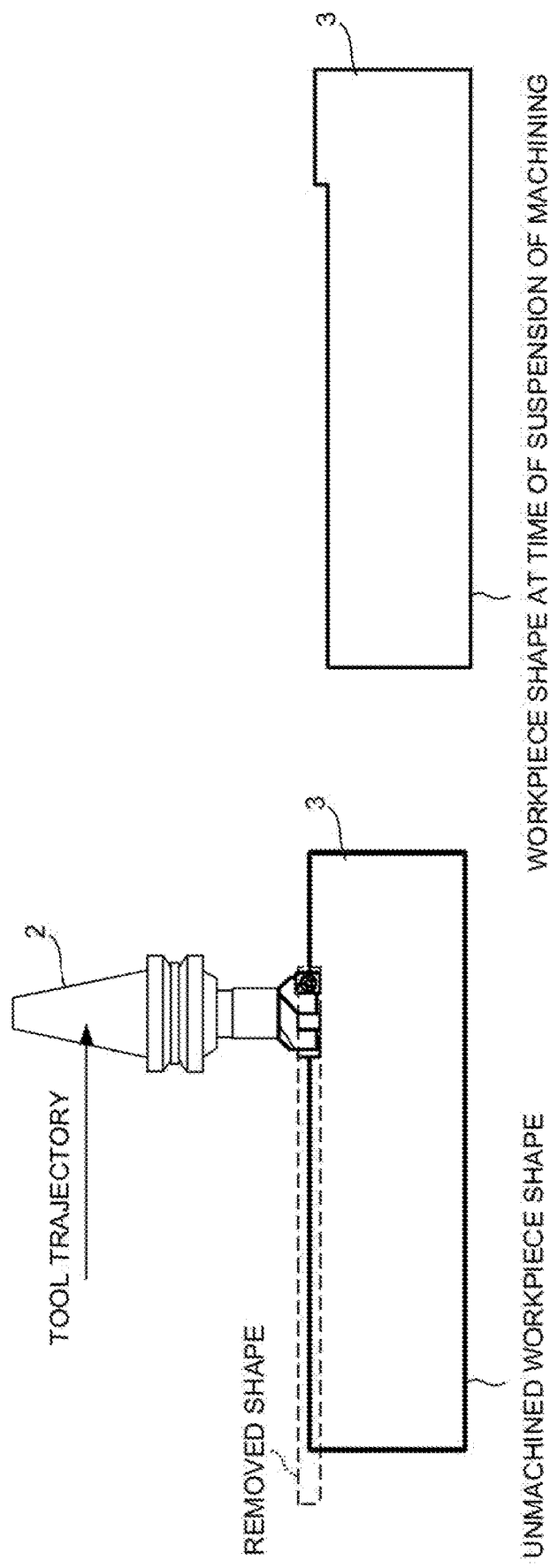
FIG. 4 is a diagram showing the operation of the numerical controller of FIG. 2 at the time of manual operation.

The operation of the numerical controller 1 capable of detecting erroneous manual operation will be described with reference to the flowchart of FIG. 3 and the schematic diagrams of FIGS. 4 to 7.

Step S101: The operator performs manual intervention during execution of the machining program.

Step S102: The numerical controller 1 detects the manual intervention and suspends the machining.

Step S103: The workpiece shape calculation unit 106 calculates a shape (removed shape) removed by the machining, based on the 3D shape information of the use tool and the tool trajectory along which the tool has passed by the time the machining is suspended. The tool trajectory can be acquired by a standard function of the numerical controller 1. In the case where a plurality of machining processes have been performed before the suspension of the machining, the removed shape is obtained from the sum total of removed shapes calculated from the use tool information and tool path information in each machining process. The workpiece shape calculation unit 106 calculates the workpiece shape at the time of suspension of the machining by calculating the difference between the obtained removed shape and the unmachined workpiece shape (see FIG. 4).

The workpiece shape calculation unit 106 may be configured to successively calculate the removed shape or the workpiece shape during the machining and previously accumulate the results of the calculation in a specific storage area (not shown). In this case, the workpiece shape calculation unit 106 can calculate the workpiece shape at the time of suspension of the machining based on one or more removed shapes or workpiece shapes that are already calculated and retained and removed shapes obtained from the last calculation of the removed shape or the workpiece shape until the suspension of the machining.

Steps S104 and S105: The movable range setting unit 107 calculates a range in which the workpiece and the tool do not collide with each other, based on the workpiece shape and information on the use tool at the time of suspension of the machining. Moreover, it sets the movable range for each axis based on the result of the calculation.

Figure 5:
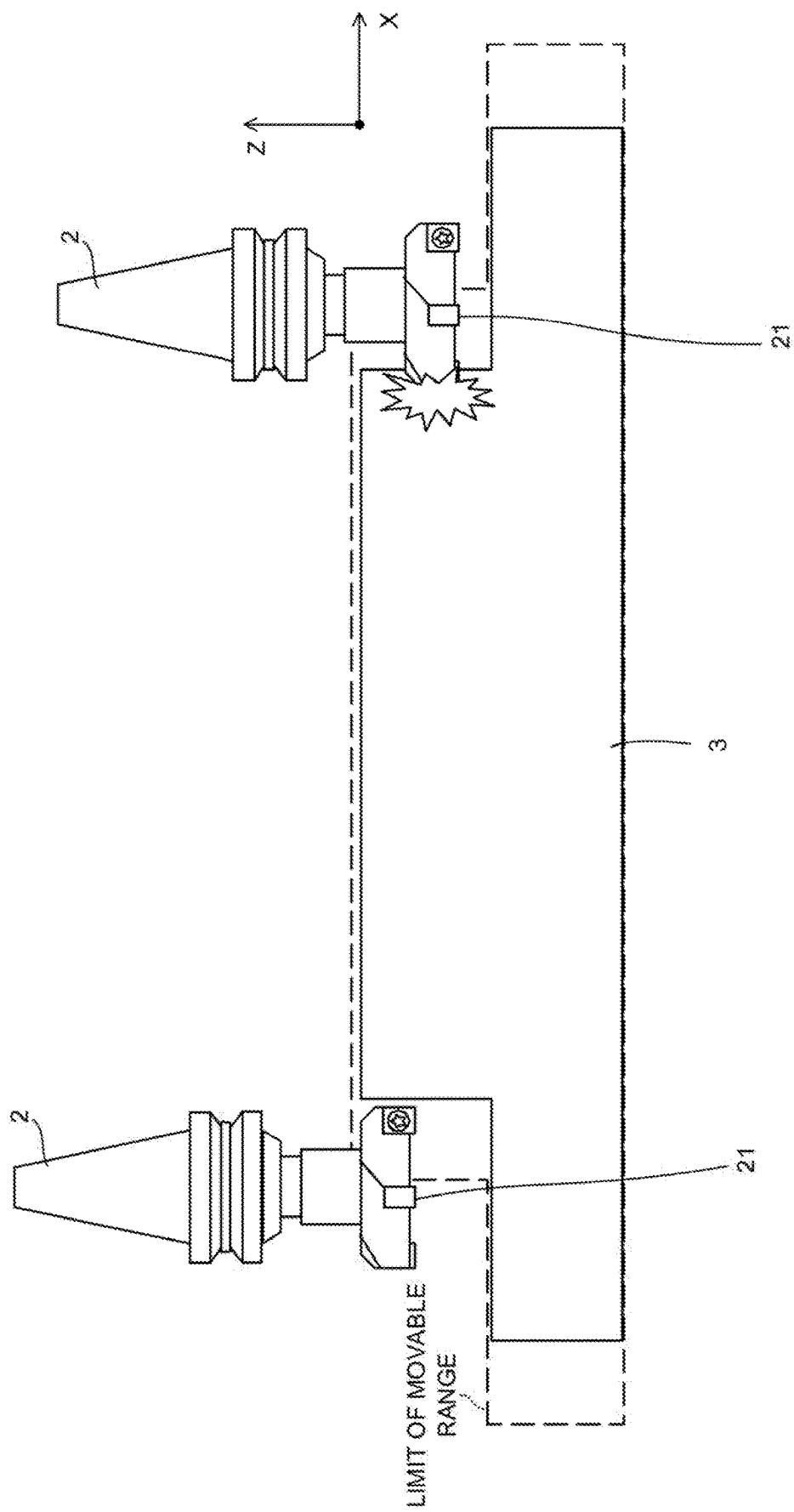
FIG. 5 is a diagram showing the operation of the numerical controller of FIG. 2 at the time of manual operation.
Figure 6:
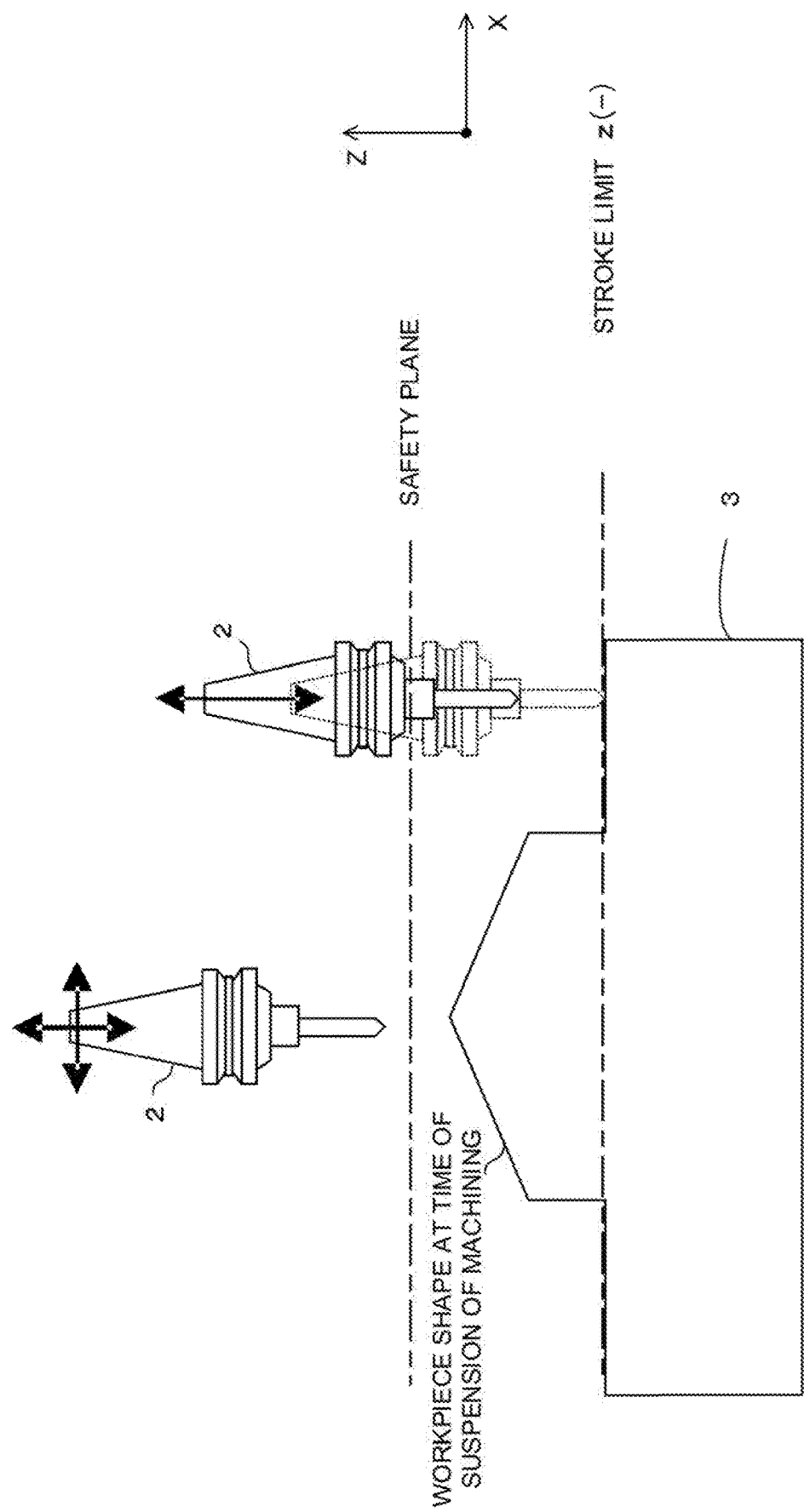
FIG. 6 is a diagram showing the operation of the numerical controller of FIG. 2 at the time of manual operation.

In the case of a three-axis machine tool, as shown in FIG. 5, for example, assuming that a tool 2 and a workpiece 3 will interfere with each other if a tool tip point 21 gets into a range in which the workpiece shape is outwardly offset by a length equal to the tool radius within the XY-plane, the movable range of the feed axis can be simply set outside the area concerned. Moreover, regarding the Z-direction, as shown in FIG. 6, a safety plane is set at the height obtained by adding a predetermined offset (≥0) to the maximum value of the Z-coordinate of the workpiece shape at the time of suspension of the machining, and the movable range can be set to an area having a value of the Z-coordinate larger than that of the safety plane.

In the case of a five-axis machine tool or if the shape of a workpiece or a tool is complicated, the above simple calculation is inadequate in many cases. Therefore, the movable range may be calculated in detail by using the 3D shape information of the workpiece and that of the use tool. Moreover, shape information of a jig or the main body of the machine tool can also be used in calculating the movable range.

Figure 7:
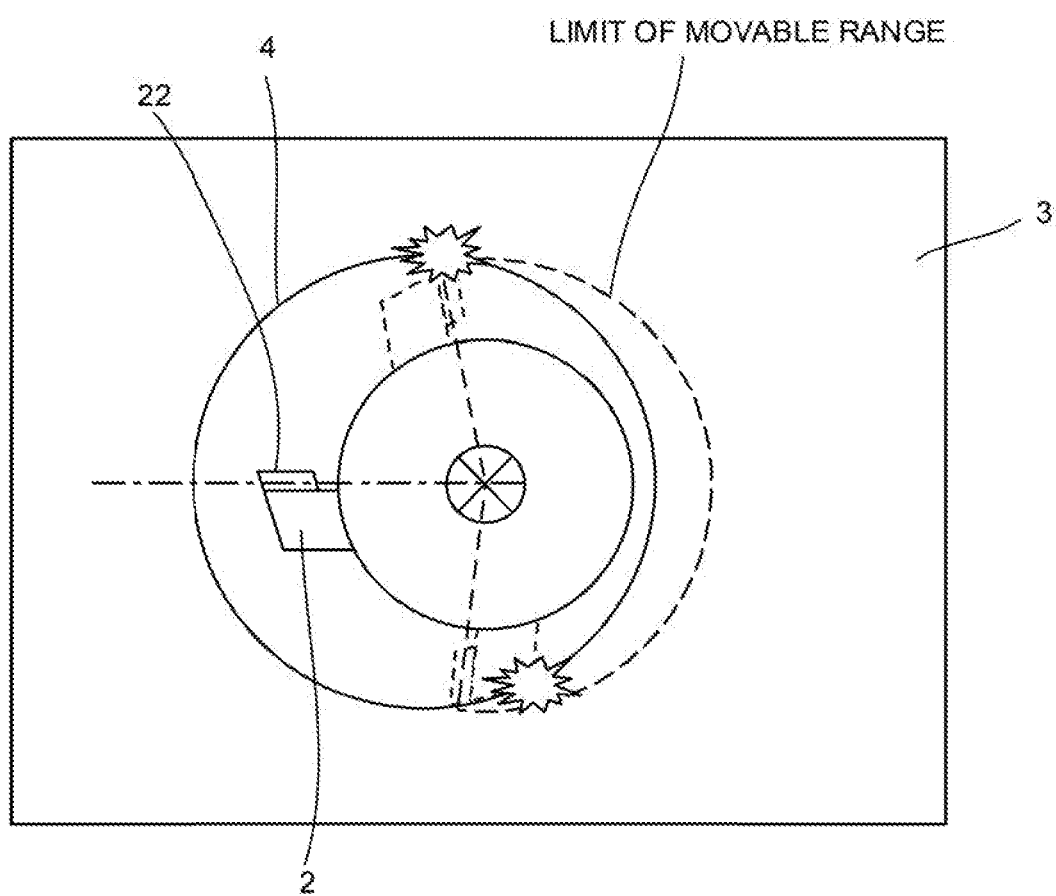
FIG. 7 is a diagram showing the operation of the numerical controller of FIG. 2 at the time of manual operation.

A single-edged boring tool is considered as an example for the calculation of a movable range of a spindle. In the single-edged boring tool, as shown in FIG. 7, the tool 2 is retracted, after boring, in a direction opposite to the edge 22 such that the edge 22 of the tool 2 goes away from a hole wall surface 4 of the workpiece 3. When the spindle is rotated, in this situation where the tool 2 is thus retracted, at a certain angle or more, the tool 2 collides with the hole wall surface 4. Thus, the range in which the tool 2 can rotate without colliding with the hole wall surface 4 is the movable range. In the example of FIG. 7, the movable range should be located outside a broken-line area inside the hole.

If tool change is performed by means of the CNC manipulator 109 during the suspension of the machining, the movable range setting unit 107 should preferably recalculate the movable range based on information on the exchanged tool.

Step S106: The operator moves the axes of the machine tool by manual operation using the CNC manipulator 109.

Step S107: The numerical controller 1 determines whether or not the movement path based on the axis movement in Step S106 passes outside the movable range. If the movement path passes outside the movable range, the processing proceeds to Step S109. If not, the processing proceeds to Step S108.

Step S108: The numerical controller 1 drives the axes.

Step S109: The numerical controller 1 prohibits the axis movement and displays a warning to the operator.

Figure 8:
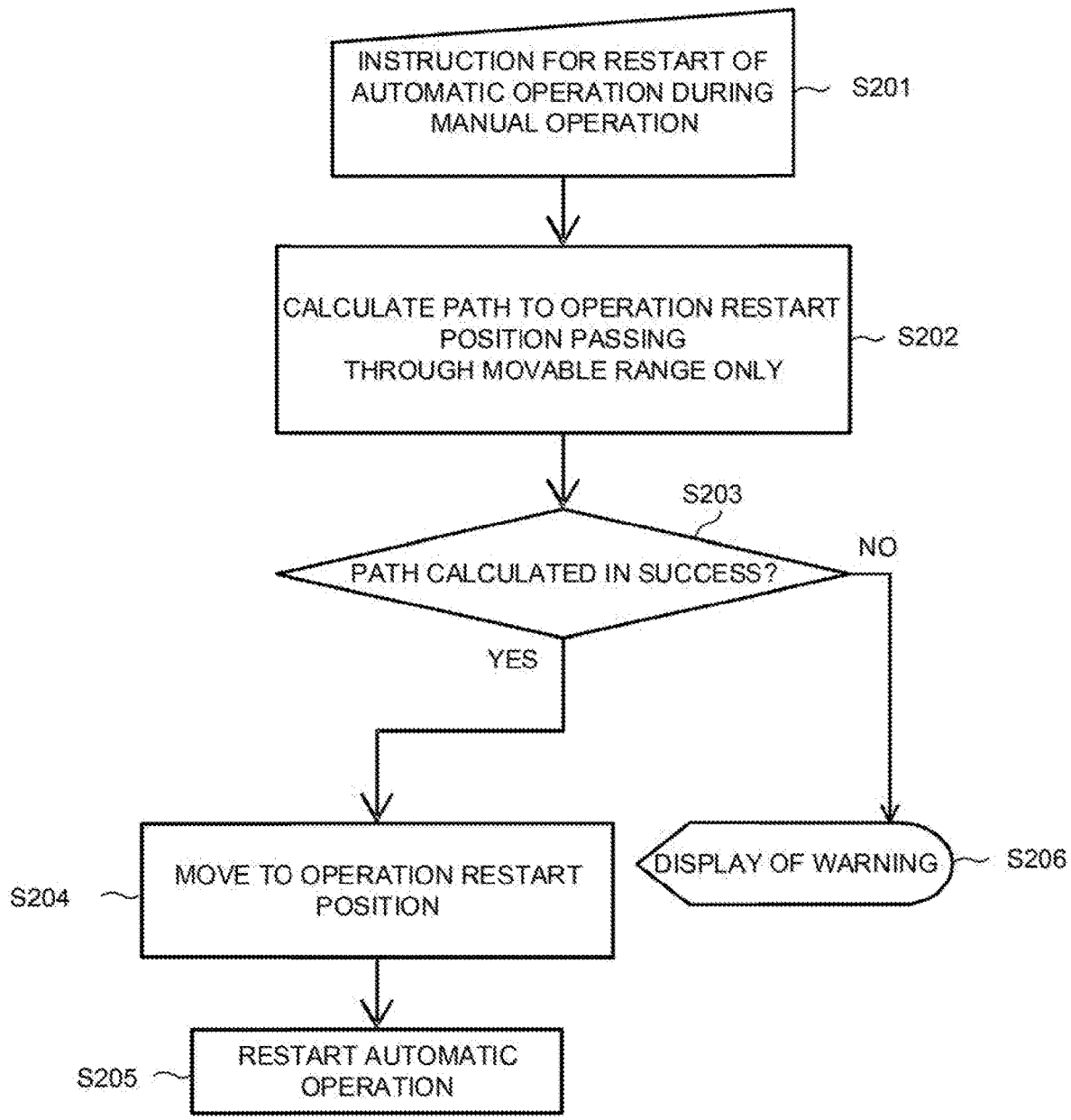
FIG. 8 is a flowchart showing an operation example of the numerical controller of FIG. 2 at the time of restart of machining.

The operation of the numerical controller 1 during movement to a machining restart position will be described with reference to the flowchart of FIG. 8 and the schematic diagram of FIG. 9.

Step S201: The operator instructs the numerical controller 1 to restart automatic operation.

Step S202: In restarting the machining, the numerical controller 1 compares the current tool position and a tool position for the machining restart with each other. If these positions are different from each other, it calculates a movement path from the current tool position to the machining restart tool position. In doing this, the numerical controller 1 sets the movement path so that the movement path may pass through only the movable range calculated by the aforementioned processing in Steps S103 to S105. Moreover, the numerical controller 1 should preferably calculate a path that requires the shortest travel time.

Step S203: The numerical controller 1 determines whether or not the path was able to be calculated in Step S202. If so, the processing proceeds to S204. If not, the processing proceeds to S206.

Steps S204 and S205: The numerical controller 1 moves the tool along the calculated path to the machining restart position and restarts the machining.

Step S206: If there is no path along which the tool moves to its machining restart position through the movable range only or if the machining start tool position is outside the movable range, the numerical controller 1 displays a warning on the information display and does not move the tool.

FIG. 9 shows an operation example at the time of restart of the machining according to the present embodiment.

A path a is a movement path of the tool 2 at the time of machining restart in the case where the processing of the present embodiment is not performed. In the middle of the movement from the current tool position to the machining restart tool position, the tool 2 inevitably interferes with the workpiece 3 being machined.

A path b is a movement path of the tool 2 at the time of machining restart in the case where the processing of the present embodiment is performed. Since the movement path which is set passes through only the movable range (range outside the broken line) provided outside the workpiece shape at the time of suspension of the machining, the tool 2 and the workpiece 3 being machined never interfere with each other.

According to the present embodiment, the numerical controller 1 calculates the workpiece shape at an arbitrary point in time based on the machining program including information on the unmachined workpiece shape and the tool shape. Moreover, if manual intervention is performed during the machining, for example, the movable range of the tool is obtained based on the workpiece shape and the tool shape immediately before the manual intervention, and the axis movement is limited lest the tool get into any area outside the movable range. In this way, defective machining and collision due to erroneous operation during the manual intervention can be prevented in advance.

Other Embodiments

While the main embodiment of the present invention has been described herein, the invention is not limited to the above embodiment and may be suitably modified and embodied in various forms.

The invention claimed is:

1. A numerical controller capable of handling information on a tool, the numerical controller comprising:
a processor configured to perform the following sequential steps:
begin machining to remove material from a workpiece with the tool based on a machining program, shape information of a use tool, and shape information of the workpiece;
in response to receiving a suspension command, stop machining the workpiece; calculate a machined shape of the workpiece at a time of the stoppage, the machined shape being calculated by determining the material removed from the workpiece based on the shape information of the tool, the shape information of the unmachined workpiece, and a tool trajectory of the tool during the machining prior to the stoppage; and
set, as a movable range of the tool, a range in which the tool never contacts the workpiece being machined, based on the machined shape of the workpiece, if manual operation is performed after the stoppage.

2. The numerical controller according to claim 1, wherein a movement path is set in the movable range when moving the tool to a machining restart position at the restart of the machining after suspension of the machining.

3. The numerical controller according to claim 1, wherein the machining program is a general-purpose command which is independent of a machine and in which the shape information of the use tool and the shape information of the unmachined workpiece are described in a format conforming to a hierarchical data model.

* * * * *